United States Patent

Azuma et al.

[11] Patent Number: 5,329,689
[45] Date of Patent: Jul. 19, 1994

[54] PROCESS FOR PRODUCING MAGNETIC HEAD SLIDER

[75] Inventors: Kasufumi Azuma, Sagamihara; Hideki Sonobe, Yokohama; Kazuo Nate, Machida; Akiko Mizushima, Yokohama; Harunobu Saito; Eisei Togawa, both of Odawara; Hiroshi Ishizaki, Hiratsuka, all of Japan

[73] Assignee: Hitachi, Ltd., Tokyo, Japan

[21] Appl. No.: 941,250

[22] Filed: Sep. 4, 1992

[30] Foreign Application Priority Data

Sep. 4, 1991 [JP] Japan ................................ 3-223934

[51] Int. Cl.$^5$ .............................................. G11B 5/42
[52] U.S. Cl. ...................................... 29/603; 156/643; 360/104
[58] Field of Search .................. 29/603, 423; 360/103, 360/104, 106; 156/643, 659.1

[56] References Cited

U.S. PATENT DOCUMENTS 4,226,018 10/1980 Nakanishii ............................. 29/603
4,948,460 8/1990 Sandaiji ............................. 29/603 X Primary Examiner—Carl E. Hall
Attorney, Agent, or Firm—Antonelli, Terry, Stout & Kraus

[57] ABSTRACT

A process for producing a magnetic head slider with at least one rail having an air bearing surface. The process includes the steps of disposing a non-metallic film on a work surface to be shaped of a magnetic head slider material so as to be in intimate contact with the work surface, patterning the non-metallic film disposed on the work surface into at least one predetermined rail shape, shaping the work surface of the magnetic head slider material utilizing the patterned non-metallic film as a mask, and stripping off the patterned non-metallic film utilized as a mask which remains on the work surface of the slider material so as to provide at least one shaped slider rail of the magnetic head slider.

18 Claims, 5 Drawing Sheets

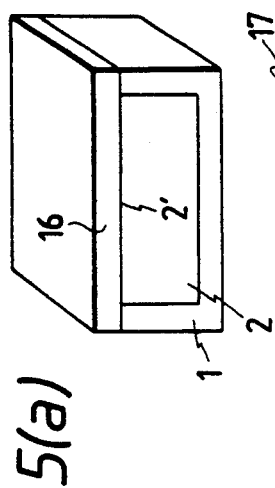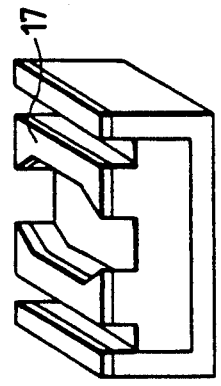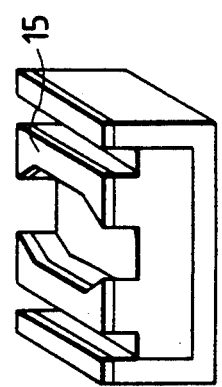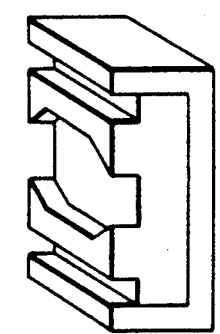
FIG. 4(a) FIG. 4(b) FIG. 4(c) FIG. 4(d)
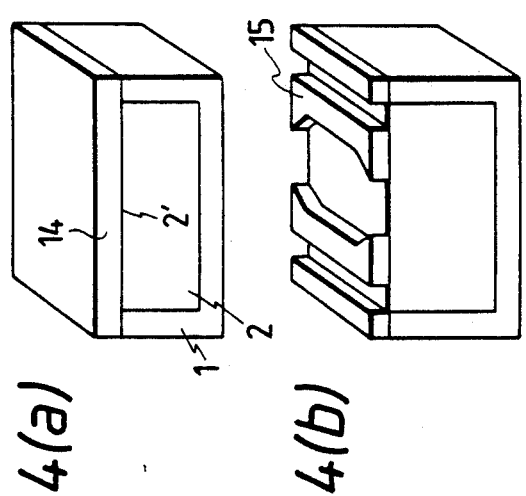
FIG. 5(a) FIG. 5(b) FIG. 5(c) FIG. 5(d)

PROCESS FOR PRODUCING MAGNETIC HEAD SLIDER

FIELD OF THE INVENTION

This invention relates to a process for manufacturing a magnetic head for used in a magnetic recorder, and more particularly to a process for producing a slider with at least one rail having an air bearing surface for use with a thin-film magnetic head.

BACKGROUND OF THE INVENTION

With the recent increase in the amount of information to be stored in magnetic disk devices, there is a requirement for higher recording density with such devices. In the case of a thin-film magnetic head caused to fly over a magnetic disk surface for recording information on the recording medium and reproducing the recorded information, therefore, the flying height of the head above the disk surface should be reduced in order to increase the recording density. In order to achieve a reduction in the flying height of the magnetic head, it is necessary to enhance the precision and accuracy of shaping in the production of a slider for the head.

Conventionally, the processing of a slider material to produce a slider for a thin-film magnetic head has been carried out by mechanical working or machining. However, in view of the requirement for higher precision as well as complicated shape including a curved surface, etc., the mechanical working or machining processes are limited in accuracy and, therefore, development of a new fabrication process has been desired. Namely, mechanical working or machining can form substantially straight shapes only, and cannot provide a rail shape comprising a curved line or complicated combination of straight lines necessary for obtaining a stable and small flying height of the magnetic head. The recent target value for the head flying height is 0.1 $\mu$m or below, the achievement of which requires a negative pressure type slider or rails having portions of curved shape.

Besides, in order to cause a thin-film magnetic head to fly stably with a gap of about 0.1 $\mu$m between the head and a magnetic disk surface, accurate finishing of the rail width is required. In the case of a rail width of several hundreds of micrometers, for example, the variation of finished size must be within a few $\mu$m. In this point, also, the mechanical working or machining processes have come to be limited in application to the slider shaping.

As a method of forming a rail shape which cannot be obtained by mechanical working or machining, there have been proposed a method of processing a slider material by sandblasting through a mask, and a method of evaporating a surface portion of the slider block by scanning with a laser beam. Although these proposed methods can produce quite complicated rail shapes, the methods are still unsatisfactory as to finishing accuracy of rail width, with variations in the finished size being 10 $\mu$m or more. Therefore, these methods have not reached a sufficient technical level for practical use.

In order to overcome the above difficulties and provide a process for forming a freely selected rail shape with high accuracy, studies have been made of the use of an organic polymeric material for a dry-etching mask through utilization of photolithographic techniques commonly used in wafer processes for semiconductor fabrication, as for example described in *Vacuum*, Vol. 38, No. 11, pp. 1007-1009 (1988). The dry etching process (hereinafter referred to simply as "dry process") using such photo-process has made possible a shaping with higher accuracy, as compared to mechanical working or machining, and without generating strains. However, magnetic-head sliders are formed generally from a difficultly processable material, such as titanium oxide, alumina, etc., and dry etch selectivity for the slider material relative to the mask material is low; accordingly, formation of a deep cut into the slider material requires a greater mask-material thickness. In practical fabrication of a slider, the mask thickness must be not less than several tens of micrometers, taking into account the etch selectivity for the slider material. On the other hand, the requirement for accuracy in finishing the slider rail width is very rigorous as described above. Consequently, the uniformity of film thickness of the mask material is an important factor.

When a thick film of a mask material is formed by, for example, roll coater printing, screen printing or the like, there is a tendency toward cracking of the thick film or toward nonuniformity of film thickness. In addition, air bubbles are liable to be entrained in the film surface, leading to unsatisfactory finishing accuracy. Furthermore, it is advantageous, from the viewpoint of throughput, to carry out the slider shaping for a plurality of wafer blocks, because side faces of the blocks cut from a wafer after the wafer process for fabrication of magnetic heads are to be processed. However, due to the presence of gaps between adjacent ones of a group of wafer blocks being processed simultaneously, such film-forming methods as spin coating are in many cases not applicable.

U.S. Pat. No. 4,226,018 discloses a method for manufacturing a floating type thin film magnetic head wherein a thin metallic film which has been patterned is placed on a magnetic head core block and the core block is ion etched for producing slider rails. However, the dimensional accuracy of such resultant slider rails is insufficient for the shaped slider rails for several reasons including the fact that the metallic thin film cannot be perfectly adhered to the surface of the core block material resulting in dimensional inaccuracies and that the previously patterned metallic film cannot be accurately positioned with respect to the surface of the core block on which it is placed and cannot be used for some desired shapes of rails.

SUMMARY OF THE INVENTION

It is accordingly an object of this invention to overcome the aforementioned difficulties involved in the dry processes of the prior art, and to provide a process for accurately forming a freely selected rail shape on a slider surface by a dry etching step, without generation of cracks, air bubbles, etc. in a mask material, even in the case of a thick mask material, and without causing nonuniformity in the film thickness of mask material, which would greatly affect the accuracy of shaping.

It is another object of the present invention to overcome the problems of the prior art by utilizing a non-metallic organic thin film which through pressure bonding can be intimately contacted over the surface to be shaped of a magnetic head slider material thereby enabling a dimensional accuracy and the subsequent patterning of the non-metallic film by a mask after bonding of the non-metallic film to the surface to be shaped and thereby enabling dimensional accuracy of a shaped rail on the order of less than 3 $\mu$m.

These and further objects, features and advantages of the present invention will become more obvious from the following description when taken in connection with the accompanying drawings which show for purposes of illustration only, several embodiments in accordance with the present invention.

BRIEF DESCRIPTION OF THE DRAWINGS

FIGS. 4(a)-4(d) illustrate processing stages for slider rail fabrication according to a still further method the present invention.

FIGS. 5(a)-5(d) illustrate processing stages for slider rail fabrication according to the prior art representing a first comparative example.

DETAILED DESCRIPTION OF THE PREFERRED EMBODIMENTS

Figure 1E:
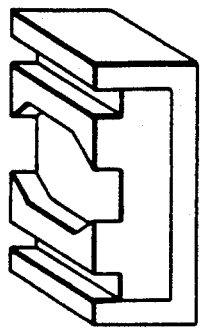
FIGS. 1(a)-1(e) illustrate processing stages for fabrication of slider rails according to a method of the present invention.

The present inventors have made studies of processes for forming a mask to be used in a dry etching process for fabrication of slider rails and, as a result of the studies, have found that when a high-polymeric material to serve as a mask material is prepared in a film form with a controlled film thickness, it is possible to reduce greatly the nonuniformity in the film thickness of the resulting mask. Also it was found important to pressure bond the mask material, in the form of film, onto the work surface of the slider material. The film referred to herein means a sheet-shaped material with a thickness of 100 μm or below and with an in-plane variation of film thickness (film thickness variation over the plane of film) of within ±3 μm. This makes it possible to reduce the in-plane variation of film thickness to below 3 μm even where a mask thickness of several tens of micrometers is required. Thus, it has newly been made possible to achieve high-accuracy shaping.

Some experimental studies made by the present inventors and the results thereof will now be described. At present, head sliders are formed mostly from difficultly processable materials such as alumina, titanium oxide, alumina-titanium carbide, etc., in view of sliding properties on disks. For high density recording, on the other hand, a head slider is required to be capable of stable flying at a small flying height above a disk.

In order to meet the requirement, it is essential to optimize the rail shape and enhance accuracy of shaping in the production of the slider. Formation of a freely selected rail shape requires a dry etching process using photolithographic techniques. Because the slider material described above has a low selectivity of etch rate in relation to the pattern mask used in dry etching, a large mask material thickness is needed for forming a deep cut in the slider material. Various coating methods such as roll coater printing, screen printing, curtain coating, dip coating, etc. were studied for their use as a method of forming a film of ordinary high-polymeric material in a thickness of about several tens of micrometers on a work surface. It was found, however, that each of the methods resulted in large nonuniformity of film thickness as well as generation of air bubbles, in the case of forming thick films; thus, these methods were found unsuitable for mask formation based on dry process. In addition, application of a liquid material to a work surface is often followed by a high-temperature treatment for obtaining desired film properties for the dry etching mask. Such a heat treatment gives rise to thermal damages to the head and the like fabricated in the preceding steps. On the other hand, it was found that where a liquid material is once formed into a film and the film is pressure bonded to a work surface, it is possible to control the in-plane distribution of film thickness to a very low level, and to control the nonuniformity of film thickness to about 3 μm or below, for masks with a thickness of several tens of micrometers. Based on the findings, precise dry processing of slider materials was carried out in the manner as follows.

Figure 1A:
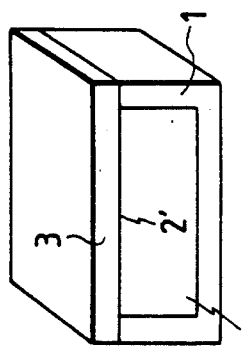

FIGS. 1(a)-1(e) show stages of the formation of magnetic head slider in accordance with the present invention. As shown in FIG. 1(a), in accordance with the present invention. As shown in FIG. 1(a), a slider block 2 is set on a jig 1, and a dry etching resistant film 3 with its thickness variation controlled extremely is pressure bonded to a work surface 2' of the slider block. According to the present-day film forming techniques, it is possible to control an in-plane variation of film thickness to within about +1 μm, although the value depends on the material for film.

Figure 1B:
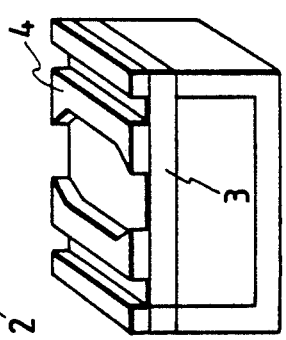

Next, as shown in FIG. 1(b), a mask material 4 resistant to dry etching is formed in a desired rail shape pattern on the film 3 by a photolithographic technique or the like. Because it is unnecessary for the mask material 4 to have a large film thickness, the mask material 4 can be applied by usual methods such as spin coating, and then subjected to exposure and development.

Figure 1C:
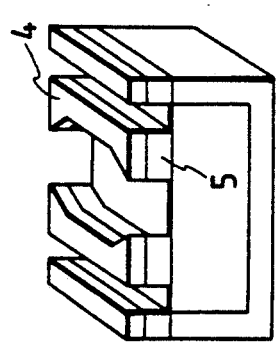
Figure 1D:
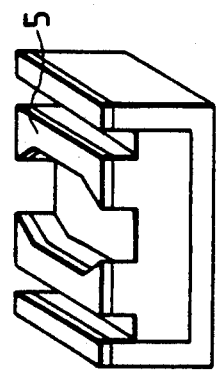

Then, the mask material 4 thus patterned is used as a mask to pattern the pressure-bonded film 3 by dry etching, as shown in FIG. 1(c) and form a patterned pressure-bonded film 5. The dry etching step is preferably carried out by oxygen-added reactive ion etching. Further, the thus patterned pressure-bonded film 5 is used as a mask in dry etching to form a slider rail shape as shown in FIG. 1(d). This dry etching step is preferably carried out by a method different from the etching method (reactive ion etching) used for patterning the pressure-bonded film 3; for example, physical ion etching by use of rare gas ion such as argon ion, or the like is preferably applied. In this drying etching step, if the mask 5 has a broad distribution of film thickness, the side face configuration of the mask is changed during the etching, resulting in large local shifts of the etched shape from the photomask pattern. Therefore, the uniformity of film thickness of the mask material is very important to accuracy of etching. Finally, the mask 5 left upon etching is stripped off, to complete the slider forming process as shown in FIG. 1(e).

Figure 2A:
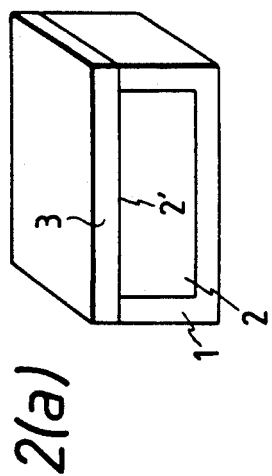
FIGS. 2(a)-2(f) illustrate processing stages for slider rail fabrication according to another embodiment of the present invention.
Figure 2B:
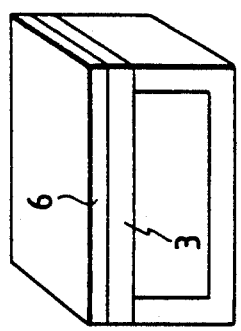
Figure 2C:
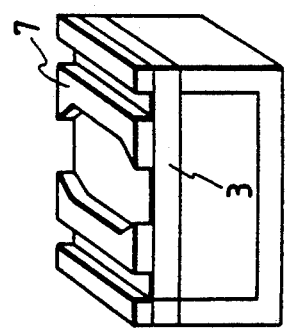
Figure 2D:
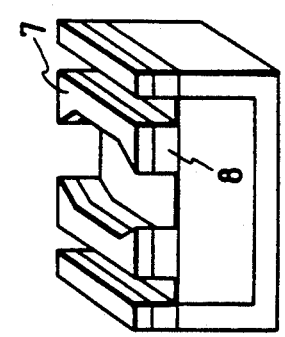
Figure 2E:
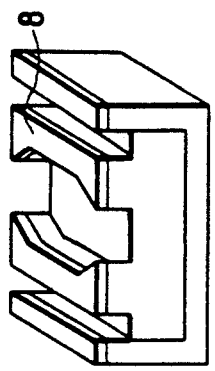
Figure 2F:
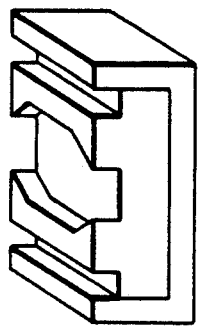

Other exemplary processes for forming a mask material 5 will be explained below with reference to FIGS. 2, 3 and 4. In FIG. 2(a), a film 3 with its thickness variation controlled is first pressure-bonded onto a work surface 2'. Next, the film 3 is coated with a silicon-containing organic resist 6 as shown in FIG. 2(b). Because the thickness of the resist coating may be small, an ordinary coating method such as spin coating was used. Then the resist 6 was patterned by photolithography, as shown in FIG. 2(c), and the resulting pattern 7 was used as a mask to pattern the film 3 by oxygen-added reactive ion etching, as shown in FIG. 2(d) and form a patterned film. Subsequently, using the thus patterned film 8 as a mask, argon ion etching was carried out to etch the slider work surface 2' to a predetermined depth, as shown in FIG. 2(e). Finally, the remaining mask material 8 was removed as shown in FIG. 2(f), to complete the slider rail fabrication.

Figure 3A:
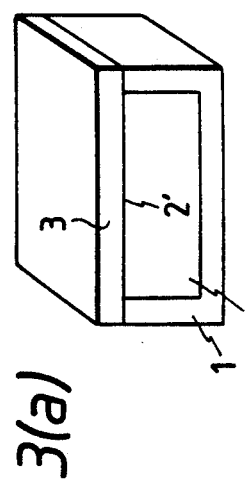
FIGS. 3(a)-3(h) illustrate processing stages for slider rail fabrication according to a further method of the present invention.
Figure 3B:
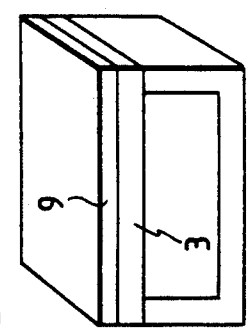
Figure 3C:
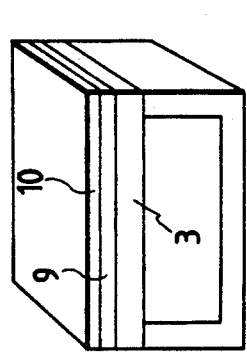
Figure 3D:
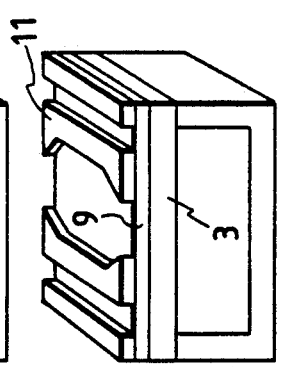
Figure 3E:
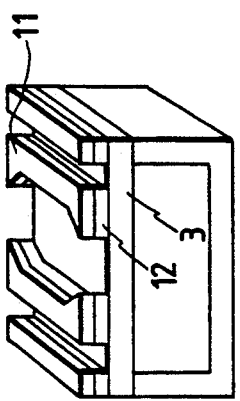

In the process illustrated in FIG. 3, first a film 3 with a controlled thickness variation is pressure bonded onto a work surface 2' as shown in FIG. 3(a) Then, an inorganic film 9 of a material (e.g. silicon or metal) for a mask in oxygen-added reactive ion etching was formed on the film 3, as shown in FIG. 3(b). A photoresist 10 was applied to the inorganic film 9, as shown in FIG. 3(c), . and was shaped into a pattern 11 by a photolithographic technique, as shown in FIG. 3(d). The pattern 11 was then used as a mask to carry out an ordinary wet etching process, thereby forming a pattern 12, as shown in FIG. 3(e).

Figure 3F:
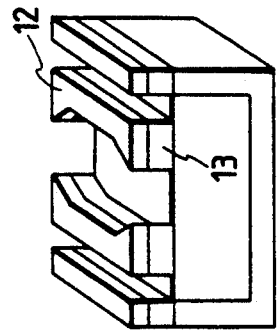
Figure 3G:
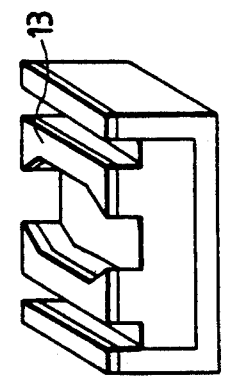
Figure 3H:
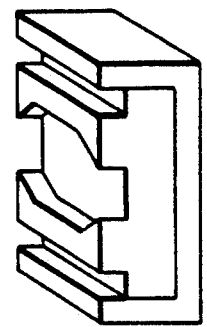

Subsequently, the film material 3 was patterned by oxygen-added reactive ion etching through the mask 12, as shown in FIG. 3(f), and the thus patterned film 13 was used as a mask in argon ion etching for forming slider rails to a predetermined depth, as shown in FIG. 3(g). Finally, the remaining mask 13 was removed as shown in FIG. 3(h), to complete the slider fabrication.

FIG. 4 illustrates an example of using a photosensitive material as a film 3 to be pressure bonded. First, as shown in FIG. 4(a), a photosensitive film 14 with a controlled film thickness was pressure bonded to a work surface 2. The pressure-bonded film 14 was then patterned by a photolithographic technique, as shown in FIG. 4(b). Subsequently, argon ion etching was carried out with the patterned film 14 as a mask 15 to form slider rails, as shown in FIG. 4(c). Finally, the residual mask 15 was removed as shown in FIG. 4(d), to complete the slider rail fabrication.

Processes for fabrication of slider rails by pressure bonding a film and preparing a mask for dry processing have thus been described above. In each of the processes it is possible, by controlling the variation of the thickness of the film to be pressure bonded, to remarkably enhance the dimensional accuracy in rail fabrication. The film 3 may be any film, provided that the film thickness can be controlled and the film is resistant to dry etching. Preferably, however, the film comprises a non-metallic organic film formed from at least one polymer component selected from the group consisting of polyimide resins, polyamide resins, polyamic acids, novolak resins, aramide resins, epoxy resins and polystyrene resins having an aromatic ring in the backbone or a side chain thereof, or formed from a resin containing at least one of the polymer components as filler. In general, resins having an aromatic ring in the molecule thereof have comparatively high resistance to drying etching, such as argon ion etching, and are therefore preferred for use in the process according to this invention.

The film used in the process of this invention is required to have adhesive properties during the etching step and, in addition, must be stripped off in the final step. Depending on the material of the film, therefore, it may be desirable to provide, on the pressure-bonding side of the film, a layer which not only enhances adhesive properties of the film but enables the film to be easily stripped off in the final step. When a thin adhesive layer of an epoxy resin or the like is preliminarily formed in a uniform thickness on the pressure-bonding side of the film and the film is pressure bonded to the slider work surface, good adhesion of the film as a mask is ensured during the dry etching step and, yet, the stripping of the film after etching can be easily achieved by use of a suitable solvent.

Pressure bonding of a film onto a slider work surface is generally carried out by thermocompression bonding. Namely, the film is pressure bonded to the slider material under such heating conditions that the film is not melted, but its surface for contact with the slider material is softened to a certain extent. In some cases, the film may be coated with an adhesive on the pressure-bonding side thereof and be pressure bonded to the slider material at normal temperature, without heating. It is important to form a pressure-bonded film under a predetermined pressure in such a manner that no air bubbles are left at the pressure-bonded surface and the film has a uniform thickness.

In the process for producing a slider for a thin-film magnetic head according to this invention, a film is pressure bonded to a work surface of a slider material. It is therefore possible to prepare a film with its thickness variation controlled, and to reduce the variation of dimensional shift in a dry etching process, thereby achieving deep and highly accurate shaping in the production of slider rails.

This invention will now be explained in more detail with reference to several examples thereof.

<EXAMPLE 1>

Referring to the processing stages for slider fabrication illustrated in FIG. 2, alumina-titanium carbide was used as a slider material, as shown in FIG. 2(a). The slider block 2 was set on a jig 1, and an aromatic polyimide film 3 was pressure bonded to a slider work surface 2'.

The film 3, prepared by uniform lamination of a 5 $\mu$m thick film of an aromatic epoxy resin on the pressure-bonding side of an aromatic polyimide film with 30 $\mu$m thickness, had a film thickness uniformity of 35 ±1 $\mu$m on the basis of an area of 50 cm in width by 50 m in length. The film 3 was pressure bonded to the work surface 2' by a laminator at a roll temperature of 150° C. followed by post-baking at 100° C. for 1 hour for enhancing adhesion.

As shown in FIG. 2(b), a silicone-based positive-type organic resist 6 (a product by Hitachi Chemical Co., Ltd.; tradename: RU-1600P; viscosity: 150 cP) having a silsesquioxane structure was applied to the film 3 in a thickness of about 5 $\mu$m by a spinner. The resist 6 was exposed to light through a glass mask (not shown) having a rail-shaped pattern by use of a projection aligner, as shown in FIG. 2(c), followed by development using a commercially available alkaline developing solution, to obtain a mask pattern 7.

Next, oxygen-added reactive ion etching was carried out through the mask pattern 7 to pattern the pressure-bonded film 3 to form the patterned pressure bonded film 8 as shown in FIG. 2(d). The etching conditions were an rf output of 300W, a reaction pressure of 50 mTorr and a bias voltage of 600V. Then, argon ion etching was carried out with the patterned pressure-bonded film 8 as a mask to form slider rail portions, as shown in FIG. 2(e). This etching was carried out under the conditions of 600V and 0.6A, with the incident ion beam being orthogonal to the work surface.

The etch rate of the alumina-titanium carbide as slider material was about 2 μm/hr, and that of the polyimide portion of the mask material was about 2.2 μm/hr. After 6-hour etching, the residual film was finally stripped off, as shown in FIG. 2(f). The stripping was carried out by immersion in acetone for 1 hour followed by ultrasonic cleaning for several minutes. The slider rails thus fabricated had a dimensional accuracy such that the variation of shifts from the photomask dimension, in terms of 3σ, was 1.8 μm at the widest (400 μm) portion of the rails. The variation value indicates extremely excellent dimensional accuracy, as is clear from comparison with those achieved the following comparative examples.

<Example 2>

Referring to the processing stages for slider fabrication illustrated in FIG. 3. As shown in FIG. 3(a), titania was used as a slider material 2. An aromatic epoxy resin film 3 was pressure bonded to a work surface 2' of the slider material 2. The film 3 had a thickness of 40 μm, and a film thickness distribution of 40±1.3 μm on the basis of an area of 25 cm in width and 50 m in length. The pressure bonding of the film 3 onto the work surface 2' was carried out by a laminator at a roll temperature of 150° C. followed by post-baking at 120° C. for 30 minutes for enhancing adhesion. Next, an aluminum thin film 9 was deposited in a thickness of 0.3 μm by physical vapor deposition, as shown in FIG. 3(b). A commercially available, phenol-novolak, alkali-soluble positive-type resist 10 was applied to the aluminum thin film 9, as shown in FIG. 3(c). Then, as shown in FIG. 3(d), the resist 10 was exposed through a glass photomask having a rail-shaped pattern in the same manner as in Example 1, and developed with a commercial developing solution to give a mask pattern 11. The aluminum thin film 9 was patterned by etching with a phosphate etching solution, as shown in FIG. 3(e), to obtain a mask pattern 12.

Subsequently, the epoxy resin film 3 was patterned by oxygen-added reactive ion etching using the aluminum mask 12, as shown in FIG. 3(f), and slider rail portions were shaped by argon ion etching, as shown in FIG. 3(g). In the argon ion etching, the incident ion beam was normal to the work surface, as in Example 1, and the etch depth into the rail material was about 17 μm. The etch rate of titania was about 2.2 μm/hr, while that of the epoxy mask was 3.0 μm/hr. Finally, the remaining film 13 was stripped off by use of acetone, as shown in FIG. 3(h). The slider rails thus fabricated had a dimensional accuracy such that the variation of shifts from the photomask dimension, in terms of 3, was 2.8 μm at the widest (300 μm) portion of the rails. The variation value indicates superior dimensional accuracy, as is clear from comparison with those achieved in the following comparative examples.

<Example 3>

Referring to the processing stages for slider fabrication illustrated in FIG. 4, alumina-titanium carbide was used as a slider material 2, as shown in FIG. 4(a). An aromatic polyamic acid film 14 having a negative-type photosensitive property was pressure bonded, as a film 3, to a work surface 2' of the slider material 2. The film 14 had a thickness of 30 μm and an in-plane thickness distribution of ±1.6 μm. The pressure bonding of the film 14 onto the work surface 2' was carried out by a laminator at a roll temperature of 90° C. followed by post-baking at 110° C. for 30 minutes.

Next, as shown in FIG. 4(b), the film 14 was exposed through a photomask (not shown) having a pattern of the slider rail shape, and developed with an N-methylpyrrolidone solvent to obtain a pattern 15. Using the pattern 15 as a mask, argon ion etching was carried out to shape slider portions, as shown in FIG. 4(c). In the ion etching, the incident ion beam was normal to the work surface, as in Example 1. The etch rate of the mask material was 2.8 μm/hr, and that of alumina-titanium carbide was 2.2 μm/hr.

Finally, the remaining film 15 was removed by using dimethylacetamide as a solvent, as shown in FIG. 4(d). The slider rails thus fabricated had a dimensional accuracy such that the variation of shifts from the photomask dimension, in terms of 3σ, was 2.6 μm at the widest (330 μm) portion of the rails. The variation value indicates outstanding dimensional accuracy, as is clear from comparison with those achieved in the following comparative examples.

Although only representative embodiments of this invention have been described as above, substantially the same effect was recognized also with other films than the above-described films. For example, films formed from at least one polymer component selected from the group consisting of polyimide resin-polyamide resin mixtures, polyamic acids, novolak resins, aramide resins and polystyrene resins having an aromatic ring in the backbone or a side chain thereof, or formed from a resin containing at least one of the polymer components as filler, gave substantially the same effect as above, with slight differences in the extent of the effect.

Two comparative examples are described below, as data for evaluation of the effectiveness of this invention.

<Comparative Example 1>

FIG. 5 illustrates a first comparative example. As shown in FIG. 5(a), alumina-titanium carbide was used as a slider material 2. A work surface 2' of the slider material 2 was coated with a phenol-novolak positive-type resist 16 commercially available as an ordinary positive-type photoresist. The coating was carried out by using a roll coater printing method, in which an operation of applying the resist in a thickness of about 10 μm and drying the resist coating was repeated three times, followed finally by hard baking at 120° C. for 30 minutes to form a 30-μm thick film. The in-plane distribution of the film thickness, after hard baking, was ±7 μm.

Next, as shown in FIG. 5(b), the resist film was exposed through a photomask (not shown) having a slider rail-shaped pattern, and developed with a commercial alkaline developing solution to obtain a pattern 17. Using the pattern 17, argon ion etching was carried out to shape slider portions, as shown in FIG. 5(c), with the incident ion beam set normal to the work surface, as in Example 1. The etch rate of the resist was 3.1 μm/hr, while that of alumina-titanium carbide was 2.2 μm/hr.

Finally, the remaining resist film 17 was removed by use of N-methylpyrrolidone as a solvent, as shown in FIG. 5(d). The slider rails thus fabricated had a dimensional accuracy such that the variation of shifts from the photomask dimension, in terms of 3σ, was 15 μm at the widest (330 μm) portion of the rails. Thus, application of a liquid photosensitive resist as a thick film leads to a marked lowering in the dimensional accuracy in shaping the rails. The major reason is probably that, due to the broad distribution of film thickness on the work surface, the profile of side faces of the resist pattern varies depending on the resist film thickness during argon ion etching, thereby making it impossible to obtain high accuracy.

<Comparative Example 2>

FIG. 6 illustrates a second comparative example. As shown in FIG. 6(a), alumina-titanium carbide was used as a slider material 2. A work surface 2' of the slider material 2 was coated with a phenol-novolak positive-type resist 16 commercially available as an ordinary positive-type photoresist. The coating was carried out by a roll coater printing method, in which an operation of applying the resist in a thickness of about 10 μm and drying the resist coating was repeated three times, followed finally by hard baking at 120° C. for 30 minutes to form a 30 μm thick film. The in-plane distribution of film thickness was ±7 μm after hard baking.

Figure 6A:
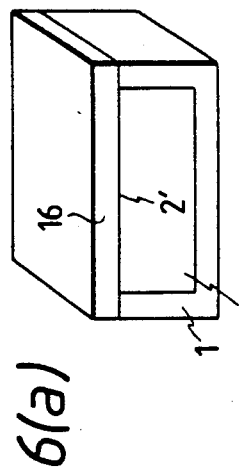
FIG. 6(a)-6(f) illustrate processing stages for slider rail fabrication according to the prior art representing a second comparative example.
Figure 6B:
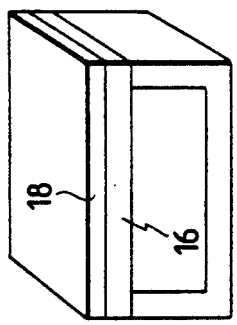

Next, as shown in FIG. 6(b), a silicone-based positive-type organic resist 18 (a product by Hitachi Chemical Co., Ltd.; tradename: RU-1600P; viscosity: 800 cP) having a silsesquioxane structure was applied to the resist film 16 by roll coating. The film thickness of the resist 18 was 7 μm, and the in-plane distribution of the total film thickness of the resists 16 and 18 was ±7 μm after hard baking.

Figure 6C:
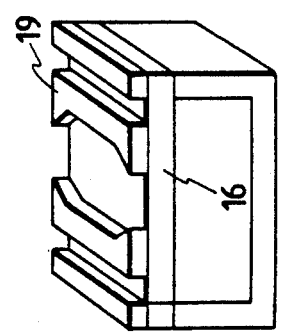
Figure 6D:
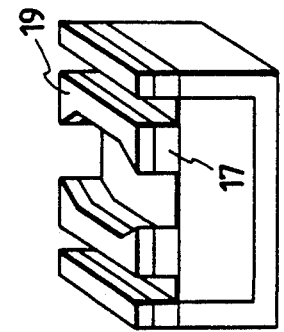
Figure 6E:
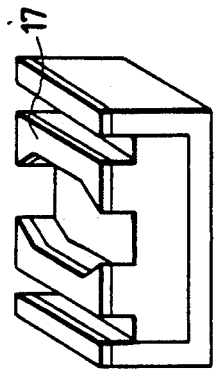

Then, exposure was carried out through a photomask having a slider rail-shaped pattern, followed by development with a commercial alkali developing solution to obtain a pattern 19, as shown in FIG. 6(c). Using the pattern 19 as a mask, oxygen-added reactive ion etching was carried out to shape the mask material 16 into a pattern 17, as shown in FIG. 6(d). The pattern 17 was used as a mask to carry out argon ion etching, thereby shaping slider rails, as shown in FIG. 6(e).

Figure 6F:
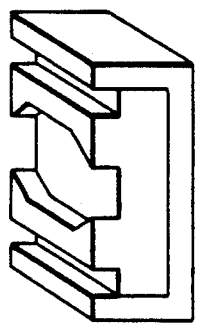

Finally, the remaining resist film 17 was removed by using N-methylpyrrolidone as a solvent, as shown in FIG. 6(f). The slider rails thus fabricated had a dimensional accuracy such that the variation of shifts from the photomask dimension, in terms of 3σ, was 12 μm at the widest (330 μm) portion of the rails. It was possible that the patterning at thick portions of the monolayer resist film in Comparative Example 1 might have lead to a poor accuracy of transfer of pattern from the photomask. Taking this into account, oxygen-added reactive ion etching was employed in Comparative Example 2 so as to enhance the accuracy of transfer from the photomask. However, the dimensional accuracy of the finished product was again low, probably because of significant nonuniformity of film thickness upon application of the liquid resist.

As has been described in detail above, according to the process of this invention, it is possible to form not only straight-shaped slider rails but also slider rails of more complicated shape including a combination of curved lines and straight lines wherein the slider rails have sidewall portions which are parallel and non-parallel to each other, as contrasted to the mechanical working or machining processes of the prior art. Furthermore, the use of a film having excellent accuracy of film thickness as a mask material for dry etching in the fabrication of slider rails of complicated shape enables a marked reduction in the variation of dimensional deviation of the resulting slider rail from the photomask. These effects make it possible to obtain a head slider which provides a magnetic head with a stable and small flying height of about 0.1 μm.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A process for producing a magnetic head slider with at least one rail having an air bearing surface, the process comprising the steps of:
    pressure bonding a non-metallic film on a work surface to be shaped of a magnetic head slider material so as to be in intimate contact with the work surface;
    patterning the non-metallic film disposed on the work surface of the magnetic head slider material into at least one predetermined rail shape;
    shaping the work surface of the magnetic head slider material utilizing the patterned non-metallic film as a mask; and
    stripping off the patterned non-metallic film utilized as a mask which remains on the work surface of the magnetic head slider material so as to provide at least one shaped slider rail of the magnetic head slider.

2. A process according to claim 1, wherein the step of pressure bonding includes utilizing thermocompression bonding.

3. A process according to claim 1, further comprising controlling the film thickness of the non-metallic film which is pressure bonded to the work surface to be not more than 100 μm.

4. A process according to claim 3, further comprising controlling an in-plane variation of film thickness of the non-metallic film which is pressure bonded to the work surface to be within ±3 μm.

5. A process according to claim 1, wherein the non-metallic film which is pressure bonded to the work surface of the slider material comprises a film formed from at least one material selected from the group consisting of polyimide resins, polyamide resins, polyamic acids, novolak resins, aramide resins, epoxy resins and polystyrene resins having an aromatic ring in the backbone or a side chain thereof.

6. A process according to claim 5, wherein the at least one material is a polymer component of which the non-metallic film is made.

7. A process according to claim 7, wherein the polymer component is a filler contained in a resin of which the non-metallic film is made.

8. A process according to claim 1, wherein the non-metallic film which is pressure bonded to the work surface of the magnetic head slider material comprises a film having an adhesive layer on the pressure-bonding side thereof.

9. A process according to claim 1, wherein the non-metallic film which is pressure bonded to the work surface of the magnetic head slider material comprises a two-layer film having a aromatic polyimide layer and an aromatic epoxy resin layer.

10. A process according to claim 1, wherein the non-metallic film which is pressure bonded to the work surface of the magnetic head slider material has a film thickness of not more than 100 μm and an in-plane variation of film thickness of within ±3 μm.

11. A process according to claim 1, wherein the at least one shaped slider rail includes two sidewalls having portions extending in a parallel and a non-parallel relation to each other.

12. A process according to claim 11, wherein at least two shaped slider rails are formed.

13. A process according to claim 1, wherein the non-metallic film which is a dry etching resistant pressure bonded film on the work surface, and the steps of patterning and shaping includes utilizing dry etching for patterning the nonmetallic film and for shaping of the work surface.

14. A process according to claim 1, further comprising the step of forming a mask pattern in the at least one predetermined rail shape and step of patterning the nonmetallic film includes utilizing the mask pattern.

15. A process according to claim 1, wherein the non-metallic film is a dry etching resistant film.

16. A process according to claim 15, further comprising the steps of:
coating the non-metallic film with a resist material containing a silicon atom; and
patterning the resist material coating in the at least one predetermined rail shape by photolithography;
wherein the step of patterning the pressure-bonded non-metallic film includes utilizing oxygen-added reactive ion etching through the pattern of the resist material coating as a mask, and the step of shaping the work surface includes utilizing physical ion etching while utilizing the patterned pressure-bonded non-metallic film as a mask.

17. A process according to claim 15, further comprising the steps of:
forming on the pressure-bonded non-metallic film an inorganic film resistant to oxygen-added reactive ion etching;
coating the inorganic film with a photoresist material and forming a resist mask in the at least one predetermined rail shape by photolithography; and
patterning the inorganic film by the use of the resist mask;
wherein the step of patterning the pressure-bonded non-metallic film includes utilizing oxygen-added reactive ion etching through the inorganic film pattern as a mask, and the step of shaping the work surface includes utilizing physical ion etching while utilizing the patterned pressure-bonded non-metallic film as a mask.

18. A process according to claim 15, wherein the step of patterning the non-metallic film includes patterning the pressure-bonded non-metallic photosensitive film in the at least one predetermined rail shape by photolithography, and the step of shaping the work surface includes utilizing physical ion etching while utilizing the pattern pressure-bonded non-metallic photosensitive film as a mask.

* * * * *